No. 752,874. PATENTED FEB. 23, 1904.
J. M. TRINER.
WEIGHING SCALE.
APPLICATION FILED JUNE 22, 1901.
NO MODEL. 2 SHEETS—SHEET 1.
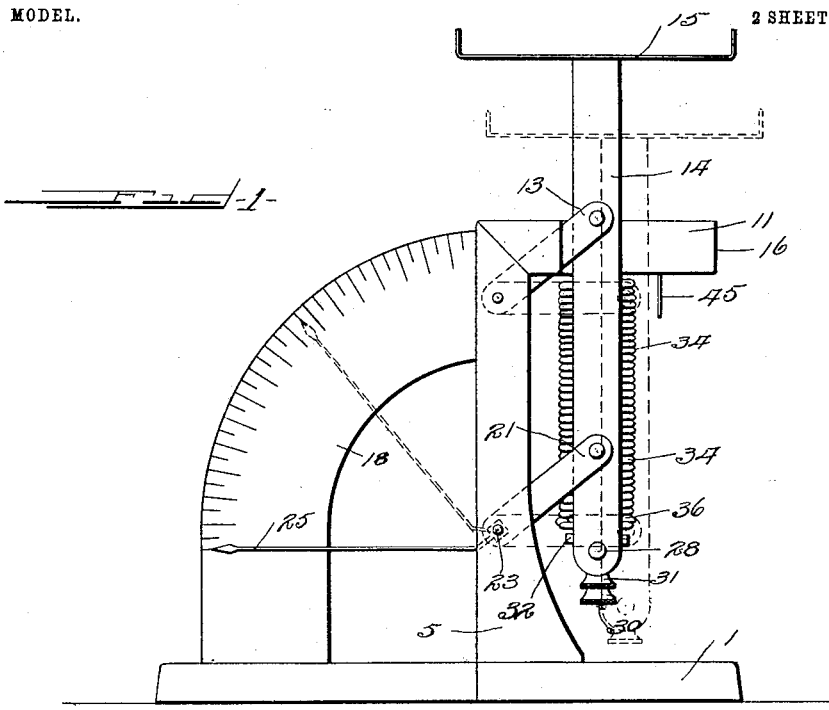
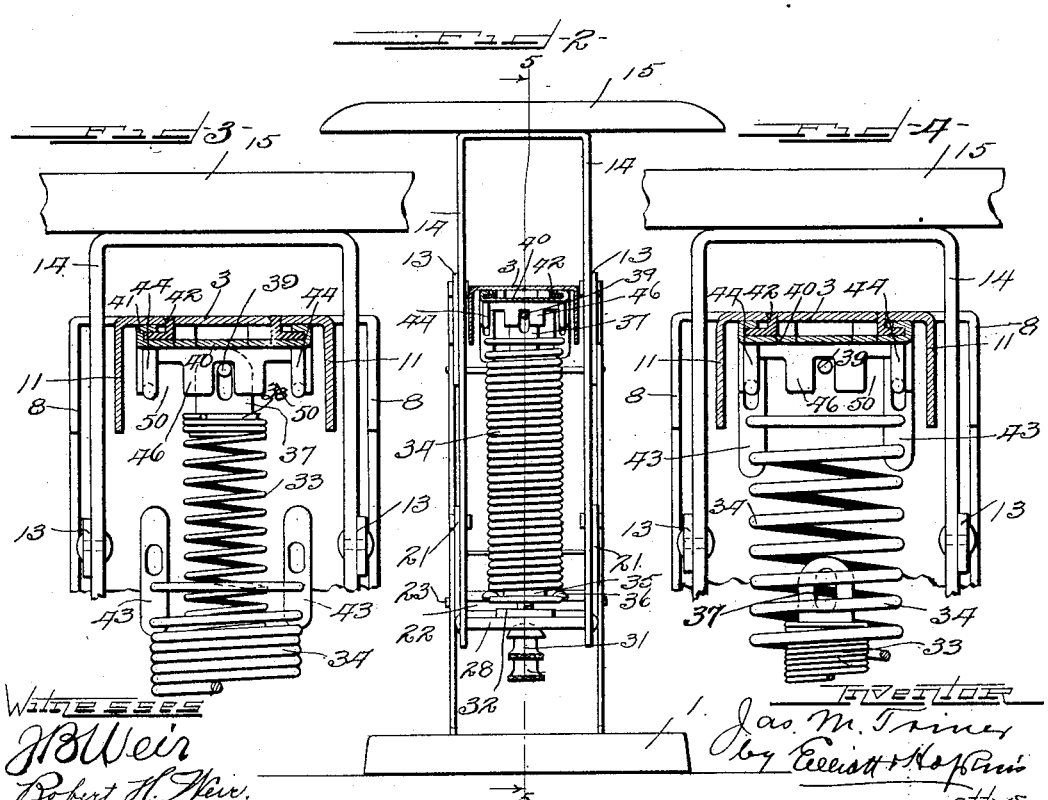
Witnesses
H. B. Weir
Robert H. Weir
Inventor
Jas. M. Triner
by Elliott & Hopkins
Attys

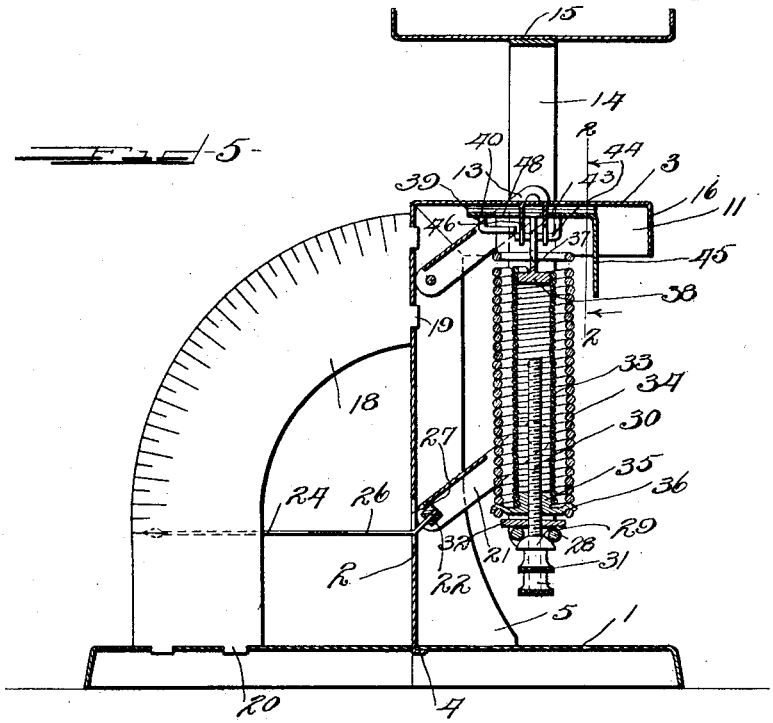
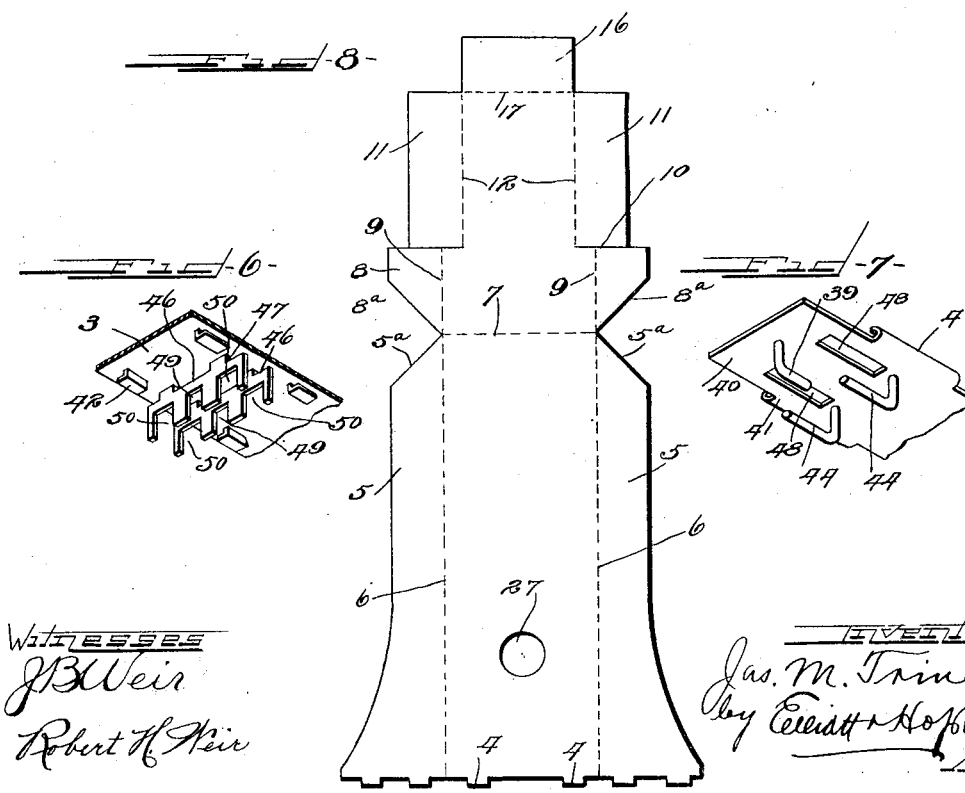

No. 752,874.                                              Patented February 23, 1904.

UNITED STATES PATENT OFFICE.

JAMES M. TRINER, OF CHICAGO, ILLINOIS.

WEIGHING-SCALE.

SPECIFICATION forming part of Letters Patent No. 752,874, dated February 23, 1904.

Application filed June 22, 1901. Serial No. 65,559. (No model.)

*To all whom it may concern:*

Be it known that I, JAMES M. TRINER, a citizen of the United States, residing at Chicago, in the county of Cook and State of Illinois, have invented certain new and useful Improvements in Weighing-Scales, of which the following is a full, clear, and exact specification.

My invention relates to weighing-scales; and it has for its primary object to provide means whereby the weight or material to be weighed may be supported by any one of a plurality of different resistances, or, in other words, by any one of a plurality of resistance members capable of sustaining different degrees of stress or tension for supporting the weight whereby the resistance member having the lesser degree of resistance may be utilized for weighing light objects, such as mail-matter, and the resistance member having the greater degree of resistance may be utilized for weighing heavier objects or material, thus greatly increasing the weighing capacity of the scale without increasing the range of movement of the index or pointer or other means employed for indicating the degree of deflection of the weight-support beyond that which would ordinarily be required for either the light-weight scale or for the heavy-weight scale.

Another object of my invention is to improve and simplify the construction of the scale-frame and mechanism whereby its cost of manufacture may be considerably reduced and its operation rendered more efficient.

With these ends in view my invention consists in certain features of novelty in the construction, combination, and arrangement of parts by which the said objects and certain other objects hereinafter appearing are attained, all as fully described with reference to the accompanying drawings and more particularly pointed out in the claims.

In the said drawings, Figure 1 is a side elevation of my improved scale. Fig. 2 is a front elevation thereof, partly in section, on the line 2 2, Fig. 5. Fig. 3 is an enlarged detail view, partly in section, on the line 2 2, Fig. 5, showing the resistance member of greater strength thrown out of action and the member of lesser strength than the other member thrown into action for supporting the weight and adapting the scale for weighing light objects. Fig. 4 is a similar view with the order of the parts reversed. Fig. 5 is a vertical sectional view taken on the line 5 5, Fig. 2. Fig. 6 is a detail perspectve view of the under side of the spring-support, showing the slide hereinafter described removed and the side flanges of the frame cut away. Fig. 7 is a detail perspective view looking at the under side of the slide, and Fig. 8 is a plan or pattern of the standard blank hereinafter described.

1 is a base, which is here shown as composed of sheet metal with surrounding flanges for stiffening it, as usual, and upon this base is mounted a standard 2, which has an overhanging arm or spring-support 3 at its upper end. This standard 2, with its various features, is preferably composed of a single piece of sheet metal originally having the form indicated in Fig. 8 and subsequently bent to give it the form illustrated in Figs. 1 and 5. The back of the upright portion of the standard is provided at its lower end with a number of lugs 4, which are passed through suitable apertures in the base 1 and clenched, as shown in Fig. 5, and on each side of the upright portion is formed a flange 5, which has an extended end on base 1, as shown in Figs. 1 and 5, to prevent it from tipping forward. These side flanges 5 are constituted by bending the sides of the blank 8 along the lines 6, and the weight-support or overhanging arm 3 is constituted by bending the blank at right angles to the line 6 and until its upper end is horizontal along the line 7. The upper ends of the flanges 5 are beveled, as shown at $5^a$, to form a miter-joint with a horizontal flange 8 on each side of the overhanging arm 3, said horizontal flanges 8 being also beveled, as shown at $8^a$, to match the bevel $5^a$ when the flanges 8 are bent downwardly along the lines 9. The sides of the blank at the outer ends of flanges 8 are split inwardly, as shown at 10, at right angles to the lines 9 and inwardly beyond said lines, so as to make the outer end of the arm 3 a little narrower than the inner end or that portion which is flanked by the flanges 8, and thus leave room between the flanges 8 and flanges 11, which are formed by bending the sides downwardly along lines 12 for the movement of arms 13, which are pivoted to support the stem 14 of the weight 15. The extreme outer end of arm 3 is provided with downwardly-extended flange 16, which is formed by bending the blank along line 17, the ends of flanges 11 16 being formed at right angles to each other, as shown in Fig. 8, so that when bent downwardly they will come together.

The upper end of the standard 2 is sustained by a brace 18, provided at its upper end with lugs 19, passed through and clenched against the standard 2, and at its lower end with similar lugs 20, passed through and clenched under the base 1. This standard is composed of flat plate or sheet of metal and arranged in an upright position substantially parallel with the plane in which the pointer or index moves, so that said brace may serve the additional useful purpose of a dial or graduation plate.

The weight-support stem 14, as shown in Figs. 2, 4, is composed of an inverted U-shaped strip, at or near the upper end of which the arms 13 are pivoted, as before described, while the lower end is pivoted to arms 21, which are parallel with the arms 13, and both the arms 13 and 21 are pivotally supported on the standard 2, the pivots being passed through the flanges 5. The pivots of the upper arms 13 may be of any common form of pivot; but the lower arms 21 are preferably secured on a square shaft 22, which in turn has round trunnions 23 journaled in the flanges 5, so that as the arms oscillate the shaft 22 will rock back and forth. The shaft 22 constitutes the support and pivot for the means for indicating the degree of deflection of the weight-support 15 by the plate placed thereon. The means employed consists of a double index, the pointer 24 of which passes to one side of the brace or dial plate 18 and may be observed with reference to the graduations indicated on that side and the pointer 25 of which passes to the opposite side of brace or scale plate 18 and may be observed with reference to different graduations indicated on that side, the graduations on one side of plate 18 indicating ounces or other small fractions of weight and those on the other side indicating pounds or other larger units of weight. These pointers 24 25 have a single arm or stem 26, which is secured to the shaft 22 and passes through an aperture 27 in standard 2.

Each pair of the arms 13 21 is provided with web 27, which connects the arms of that pair together, the whole being constituted by a single plate of sheet metal bent into the form shown, and said web serves to impart rigidity to the arms and prevent side racking of the mechanism.

The side members of the U-shaped stem 14 pass downwardly on each side of the narrower portion of the overhanging arm 13, and they are provided at their lower ends with a pivoted rod or cross-bar 28, having a central aperture 29, through which passes a screw 30, having a fixed head 31 bearing under and supporting cross-bar 28 and a jam-nut 32 for locking screw 30 at the desired adjustment. The upper end of screw 30 is inserted into the inner one of two telescoped springs 33 34 and is threaded in a nut 35, which has a spiral groove or threads on its periphery screwed into the inner spring 33, and laterally-projecting lugs 36, which engage between the convolutions of the outer spring 34, whereby the nut is given firm connection with both springs, and the screw 30 is thereby enabled to support the cross-bar 28, and consequently the weight-support 15. These springs 33 34 are preferably of different strengths, and they constitute a species of what has before been referred to as "resistance" members, possessing different degrees of resistance for supporting the weight or material to be weighed, the object being to render either of the springs effective for supporting the weight at will, whereby when it is desired to use the scale for weighing light objects, such as mail-matter, the smaller spring alone may be employed, and in that event the index pointing to the lighter scale graduations on plate 18 would be observed, and when it is desired to weigh heavier objects, such as merchandise, I prefer to render the lighter spring inoperative and support the weight entirely by the heavier spring instead of supporting it by both, and in that event the graduations on plate 18, which indicate pounds, or the heavier weights would be observed with reference to the movements of the index on that side. I will now describe the means for supporting either of these springs 33 34 from the overhanging arm 3.

As better indicated in Figs. 3 and 4, the upper end of the inner spring 33 is provided with an eye or loop 37, which may be secured to the spring in any suitable way, as by means of a nut 38, (see Fig. 5,) and this eye or loop 37 may be supported by a hook or lug 39, secured to the under side of a horizontally-movable slide 40. This slide is in turn supported on the under side of arm 3 by means of flanges 41, turned up on the sides thereof and engaging over angles 42, secured to the under side of arm 3, as better shown in Fig. 6. The spring 34 is provided at its upper end with a pair of eyes or loops 43, which are secured thereto by having two or more of the convolutions passed through them, and the under side of slide 40 is provided with a pair of lugs or hooks 44, which project in the opposite direction from that of the lug or hook 39 and are so arranged as to engage in the eyes 43 when the slide 41 is pushed in one direction, which may be done by means of a finger-piece 45, projecting downwardly therefrom, as shown in Figs. 1 and 5. With this construction it will be seen that with the parts arranged as in Fig. 3, for example, the weight-support 15 will be sustained by the inner spring alone on the lug or hook 39; but should the outer spring be elevated until these eyes 43 come into line with hooks 44 and the slide 41 then pushed inwardly the hook 39 will disengage the eye or loop 37 from the inner spring, while the hooks 44 will impale the eyes 43, and thus support the outer spring independently of the inner spring, and vice versa.

In order that eyes or loops 37 43 may not follow back and forth with the slide 40 when thus operated and fail to disengage from their respective hooks 39 44 when desired, the under side of the arm 3 is provided with guides or strippers between which the loops 37 43 engage when they rise into position for receiving their respective supporting-hooks. These strippers are better shown in Fig. 6 and consist of plates 46, having shanks 47 passing through slots 48 in slide 40 and being secured to arm 3, and these plates also have alined apertures or notches 49 to permit the hook 39 to pass through the loop 37 when the latter rises between the plates 46 and alined notches or apertures 50 for the passage of hooks 44 to enable the latter to pass through loops or eyes 43 when the latter rise between the plates 46. As the arms 13 21 swing downwardly the lower ends of the standards 14 move laterally, and as a consequence the spring 34 is deflected at its lower end from a perpendicular to an inclined position. Heretofore this lateral movement of the spring resulted in bending it and as a consequence increasing the friction on the pivots, which resulted in inaccuracy, because the friction varies and also renders the movement of the standards 14 less sensitive, enabling the standard to descend to a lower point at one time than it does at another even under the same weight, accordingly as it is forced down rapidly or slowly. With my invention, however, having the lower end of the spring swiveled by the pivot 28 to the standards 14 and the upper end of the spring supported in such a manner that it may swing or swivel back and forth on the hooks 39 40 without materially bending this side torsion or bending of the spring as a result of its lateral deflection is entirely avoided, and the spring is caused at all times to pull in a straight line between the pivot 28 and its point of attachment at the upper end.

Any displacement of either index 24 25, resulting from shifting from one spring to the other, may be rectified by turning the head 31 up or down to raise or lower the point, if necessary, to make it register with the zero-mark when in its initial or starting position.

Having thus described my invention, what I claim as new therein, and desire to secure by Letters Patent, is—

1. In a scale the combination of a weight-support, two unequal resistances both operatively connected therewith, means for supporting and releasing said resistance members alternately comprising a slide and operatively-projecting support-hooks thereon, and means for indicating the degree of deflection of said weight-support, substantially as set forth.

2. In a scale the combination of a base, a standard for supporting the weighing mechanism planted on said base and consisting of an upright portion having lateral side flanges 5, a horizontal portion having the side flanges 8 mitered with the upper ends of flanges 5, the flanges 11 closer together than the flanges 8, a brace secured to said base and to said standard and the weighing mechanism supported on said standard, substantially as set forth.

3. In a scale, the combination of two resistance members, a platform for supporting the weight, a stem for supporting said platform, a swivel connecting said stem with both of said resistance members, means for holding said stem perpendicular while rising and falling in an arc of a circle, means for supporting either of said resistance members, and means for indicating the degree of deflection of said platform, substanially as set forth.

4. In a scale, the combination of two resistance members, a weight-support secured to one end of said resistance members, each of said resistance members having an eye at the other end, a slide having hooks for engaging in and supporting said eyes, respectively, means for holding said eyes against lateral deflection while said hooks are entering them, and means for indicating the degree of deflection of said weight-support, substantially as set forth.

5. In a weighing-scale, the combination of means for supporting the weight, a spring having a pivotal or rocking support at its upper end, a cross-bar having swivel connection with said weight-supporting means and extending transversely of said spring, and an adjusting-screw secured to said spring and cross-bar.

6. In a scale, the combination of a weight-support, two unequal resistances both operatively connected therewith, supporting means individual to said resistances secured thereto respectively, a slide comprising means for engaging said supporting means respectively alternately as the slide is reciprocated, and means for supporting said slide, substantially as set forth.

7. In a weighing-scale, the combination of means for supporting the weight, a two-part stem for supporting said means, an index-arm operatively connected with the weight-support, a spring, a rocking or swivel support for said spring at one end thereof, a cross-bar having its ends journaled in the two parts of said stem transversely of said spring and an adjusting-screw having one end adjustably secured to the other end of the spring and its other end rotatably secured to said cross-bar.

8. In a weighing-scale, the combination of means for supporting the weight, a stem for said weight-supporting means, an index-arm operatively connected with said weight-supporting means, a coil-spring arranged lengthwise of said stem, a rocking support for the upper end of said spring, a cross-bar swiveled to said stem and projecting transversely of said spring, a nut secured in the lower end of said spring, an adjusting-screw passing through said cross-bar and engaging in said nut lengthwise of the spring and a jam-nut on said screw engaging against said cross-bar for locking the screw at the desired adjustment.

9. In a weighing-scale, the combination of a frame comprising a standard having an overhanging upper end, a two-part upright stem straddling said overhanging end, parallel arms pivoting said stem to said standard, a cross-bar journaled horizontally between the lower ends of said parts of the stem, a coil-spring secured at its upper end between said parts of the stem to said overhanging end of the standard, and means for securing the lower end of said spring to said cross-bar.

JAMES M. TRINER.

Witnesses:
  F. A. HOPKINS,
  J. E. SMITH.